United States Patent
Engström et al.

(10) Patent No.: US 9,234,546 B2
(45) Date of Patent: Jan. 12, 2016

(54) LARGE SEALED SELF ALIGNING ROLLER BEARING

(71) Applicants: Bengt Engström, Pixbo (SE); Lars Stigsjöö, Angered (SE); Pär Strand, Göteborg (SE)

(72) Inventors: Bengt Engström, Pixbo (SE); Lars Stigsjöö, Angered (SE); Pär Strand, Göteborg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/370,406

(22) PCT Filed: Dec. 10, 2012

(86) PCT No.: PCT/SE2012/000198
§ 371 (c)(1),
(2) Date: Jul. 2, 2014

(87) PCT Pub. No.: WO2013/103307
PCT Pub. Date: Jul. 11, 2013

(65) Prior Publication Data
US 2015/0110431 A1    Apr. 23, 2015

(30) Foreign Application Priority Data
Jan. 2, 2012 (SE) ...................... 1200006

(51) Int. Cl.
| | | |
|---|---|---|
| F16C 33/78 | (2006.01) | |
| F16J 15/32 | (2006.01) | |
| F16J 15/16 | (2006.01) | |
| F16C 23/08 | (2006.01) | |

(52) U.S. Cl.
CPC ........... *F16C 33/7823* (2013.01); *F16C 23/084* (2013.01); *F16C 33/783* (2013.01); *F16C 33/7803* (2013.01); *F16C 33/7806* (2013.01); *F16C 33/7856* (2013.01); *F16J 15/3268* (2013.01); *F16J 15/3272* (2013.01); *F16C 23/086* (2013.01); *F16J 15/16* (2013.01)

(58) Field of Classification Search
CPC ............... F16C 33/784; F16C 33/7843; F16C 33/7853; F16C 33/7856; F16C 33/78; F16C 33/7803; F16C 33/783; F16C 33/7816; F16C 33/7823; F16J 15/16; F16J 15/32; F16J 15/3276; F16J 15/3268; F16J 15/3204; F16J 15/3272
See application file for complete search history.

(56) References Cited

U.S. PATENT DOCUMENTS 3,032,346 A * 5/1962 Sullivan .................. 277/565
4,692,040 A * 9/1987 Ebaugh et al. ............. 384/484
(Continued)

FOREIGN PATENT DOCUMENTS

DE      29704150 U1    4/1997
DE    102006002991 A1   8/2007
(Continued)

*Primary Examiner* — Alan B Waits
(74) *Attorney, Agent, or Firm* — Bryan Peckjian; SKF USA Inc. Patent Dept.

(57) ABSTRACT

A large sealed self aligning roller bearing including a first race ring, a second race ring, rolling bodies arranged between the first race ring and the second race ring in one or more rows and a built-in sealing member. The sealing member includes an annular plate ring with a first periphery portion and a second periphery portion. The first ring includes a mounting groove for receiving the first periphery portion and the second race ring includes a sealing surface.

10 Claims, 4 Drawing Sheets

(56) References Cited

U.S. PATENT DOCUMENTS

| | | | |
|---|---|---|---|
| 5,232,292 A * | 8/1993 | Stackling et al. | 384/484 |
| 5,419,642 A * | 5/1995 | McLarty | 384/486 |
| 5,649,772 A * | 7/1997 | Schlereth et al. | 384/484 |
| 6,332,718 B1 * | 12/2001 | Tadic et al. | 384/477 |
| 6,843,410 B2 * | 1/2005 | Terazawa | 235/103 |
| 7,011,452 B2 * | 3/2006 | Suzuki et al. | 384/486 |
| 8,011,670 B2 * | 9/2011 | Shibayama et al. | 277/551 |
| 8,540,433 B2 * | 9/2013 | Wendeberg et al. | 384/585 |
| 2007/0154124 A1 * | 7/2007 | Inoue et al. | 384/488 |
| 2008/0019624 A1 * | 1/2008 | Kubo | 384/147 |
| 2012/0230622 A1 * | 9/2012 | Yabe et al. | 384/448 |

FOREIGN PATENT DOCUMENTS

| | | |
|---|---|---|
| EP | 0577912 A1 | 1/1994 |
| SE | 451081 B | 8/1987 |
| SE | 454904 B | 6/1988 |
| WO | 2006019347 A1 | 2/2006 |
| WO | 2010099776 A1 | 9/2010 |

* cited by examiner

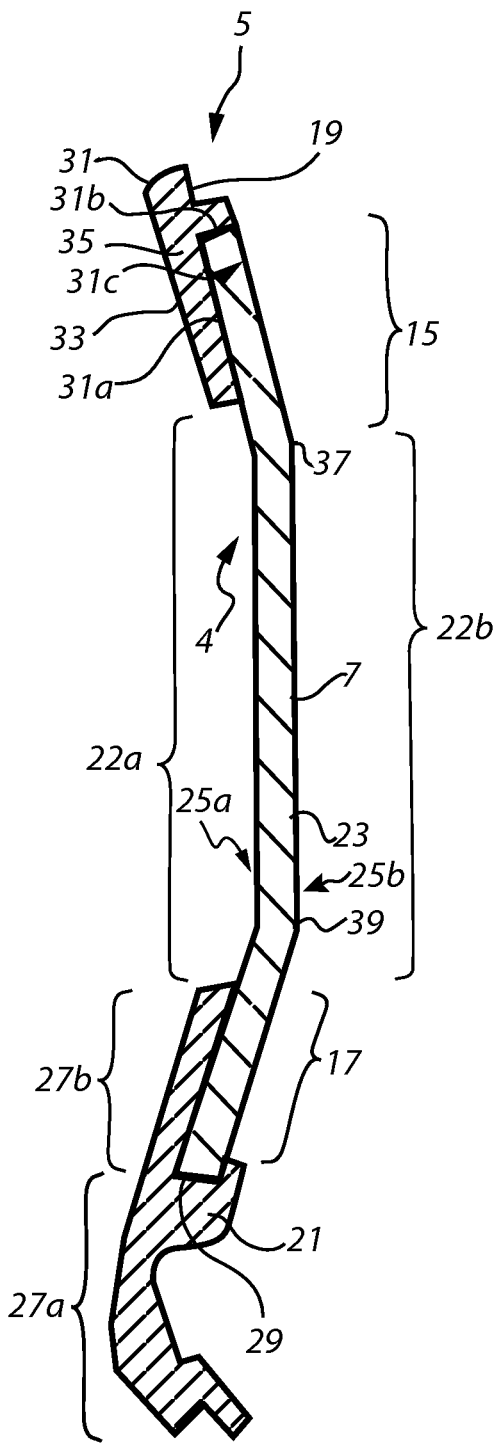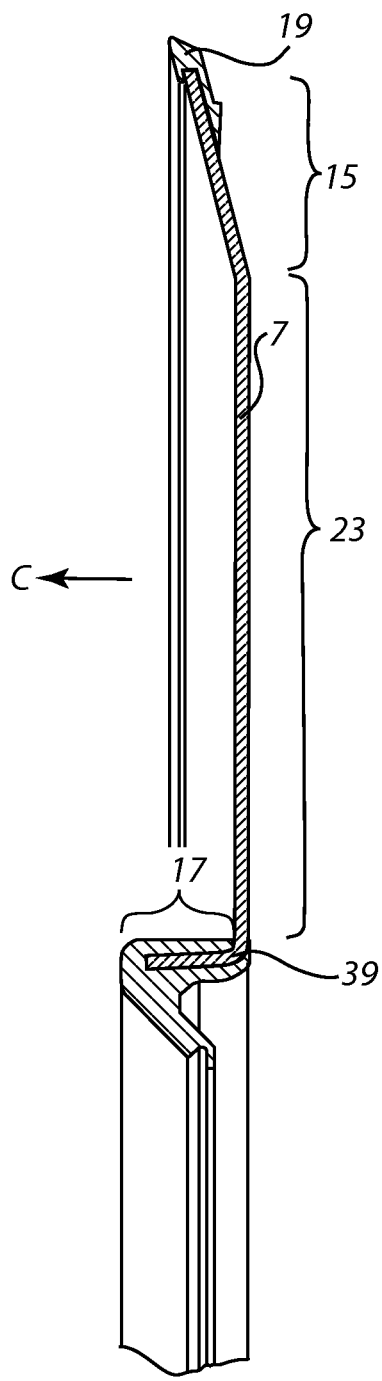
*Fig. 1*  *Fig. 2*

LARGE SEALED SELF ALIGNING ROLLER BEARING

CROSS REFERENCE TO RELATED APPLICATION

This is a National Stage application claiming the benefit of International Application Number PCT/SE2012/000198 filed on 10 Dec. 2012 (10.12.2012), which claims the benefit of Sweden Patent Application 1200006-3 filed on 2 Jan. 2012, both of which are incorporated herein by reference in their entireties.

TECHNICAL FIELD

The present invention relates to a large sealed self aligning bearing including a first race ring, a second race ring, rolling bodies arranged between the first race ring and the second race ring in one or more rows and a built-in sealing member.

BACKGROUND OF THE INVENTION

The service life of a bearing is reduced by dirt and impurities penetrating into the bearing. The mounting of the bearing on one hand may occur in dirty surroundings, and the bearings may, on the other hand during operation, be subjected to dirt, metal chips, etcetera. At use of bearings in continuous casting machines, in rolling mills, paper making machines, etcetera, the bearings may be highly exposed to different kinds of impurities. This is furthermore putting high demands on maintenance.

Thus a good seal for a bearing in many cases can be most important, on one hand for increasing the service life and on the other hand for reducing the requirement of maintenance.

Known solutions for designing sealed bearings are based on two different principles. A seal can either be assembled on a bearing or be built into the bearing. Embodiments of how a seal is assembled on a bearing is shown e.g. in SE-B-454904 and in SE-B-451 081. The seal in these embodiments is constituted by two cooperating sheet metal rings, whereby at least one of the sheet metal rings is notch joined into the outer race ring, whereas the other is fitted to the inner race ring. This solution however means that the seal will project outside the side planes, which in some cases necessitates modifications of the bearing housing and also of the mounting and dismantling tools, etcetera.

According to the other alternative mentioned above, the seal is built into the bearing. In this case the seal is not projecting from the side surfaces of the bearing. Assembly of the seal inside one of the bearing side surfaces requires space and for this reason the width of the bearing itself has been increased in known solutions. Alternatively, the length of the rollers or the contact angle have been reduced. At a known, sealed bearing, the width of the bearing has been increased as compared to a corresponding unsealed bearing in order to maintain the carrying capacity.

In smaller size bearings, typically less than 200 mm in outer diameter, it is common to provide the sealing member with an attachment portion at first peripheral portion of an annular plate ring with a spring portion arranged for introduction into a groove. The spring, which typically is a bent part of the annular plate ring will keep the sealing member in place. This solution which has been promising for smaller size bearings has not been used for larger size bearings. One reason for this is that the sealing lips of larger size bearing are positioned at a greater distance from the mounting groove and that higher tolerance requirements regarding the position of the built-in sealing member is required. Another reason is that due to the increased requirement of rigidity of the annular plate member need to be thicker, which increases difficulties with forming a spring portion without formation of cracks that may lead to breaking of the annular plate ring.

For mid size sealed self aligning bearing it has been proposed to mount the seal in a radial groove in a first outer race ring, where it is fixed with a locking ring and where the opposite side of the seal engages a tapering surface on the inner race ring. EP 577912 relates to a spherical roller bearing including a built in-sealing member.

Large size self aligning bearings are difficult to seal since these bearings are made for handling large angular misalignments. For using seals in those types of bearings it is necessary to compromise. A typical maximum misalignment for a sealed off spherical roller bearing using conventional technology is 0.5[deg.]

With large size self aligning bearings is intended self aligning bearings having an outer diameter above 500 mm.

A built in seal for a large size self aligning bearings is proposed in WO2006/019347. This type of bearing requires additional space in an axial direction. Further the seal is somewhat sensitive due to the pliable nature of the bellow forming the seal for the bearing.

An object of the invention is to provide a large sealed self aligning bearing, which obviates the need for a bellow as a built-in sealing member.

Another object is to provide a large sealed self aligning bearing, which gives additional space for cages/retainers extending outside of the rolling bodies or which gives more space for the rolling bodies before the ring cage or rolling body interferes with the built-in sealing member. Still another object is to provide a sealed self aligning bearing, which provides an improved seal design for a large size bearing.

SHORT DESCRIPTION OF THE INVENTION

These objects are achieved by a large sealed self aligning bearing according to claim 1. A large sealed self aligning roller bearing according to the invention includes a first race ring, a second race ring, rolling bodies arranged between the first race ring and the second race ring in one or more rows and a built-in sealing member. A large sealed self aligning roller bearing is a rolling bearing having an external diameter of 500 mm or more.

A built-in sealing member is a sealing member which is at one end attached directly to one of the race rings and which at the other end carries a resilient member arranged to be in abutment with a sealing surface arranged on the other race ring. The race rings are monolithic annular bodies at which the race tracks for the rolling bodies are formed.

The built-in sealing member includes an annular plate ring with a first periphery portion and a second periphery portion. The first and second periphery portions are constituted by a radially outer part of the annular plate ring positioned away from the centre of the plate ring and a radially inner part of the annular plate ring positioned toward the centre of the plate ring. The plate ring may have a flat or a curved cross section. Further, the annular plate ring may have one or more knees forming bends of the annular plate ring. The plate ring may have a curved or flat cross-section between these knees. The shape of the plate ring will generally be designed to reduce the amount that the sealing member protrudes from a side plane defined by the sides of the race rings or to allow a portion of the built in sealing member to be flush with or lie at a small axial distance inside the side plane defined by the sides of the race rings.

The first race ring includes a mounting groove for receiving at least a part of the first periphery portion of the annular plate ring. The mounting groove forms an annular trace at which the annular plate ring is secured to the first race ring. The second race ring includes a sealing surface. The sealing surface may be an extension of the race track of the second race ring. Alternatively the sealing surface may be located on a flange portion of the second race ring, which flange portion is intended to operate as a guide member for the rolling bodies. For spherical roller bearings, the sealing surface is cone-shaped with its decreasing radius being directed from the centre of the roller bearing.

The built-in sealing member includes a first resilient member which is attached to the first periphery portion of the annular plate ring for sealing said mounting groove. The built-in sealing member also includes a second separate resilient member which is attached to the second periphery portion for sealing abutment with said sealing surface on said second race ring. The first and second separate resilient members are spaced apart to leave an annular land in between the separate first and second resilient members. The annular land is positioned in a mid section of said annular plate ring and includes both an interior side of the annular plate ring arranged to face an interior of a bearing when mounted and an exterior side of the annular plate ring arranged to face the exterior when mounted free from resilient material. Hence, the built-in sealing member is provided with separate resilient members at both the inner and outer peripheries, which resilient members are not in direct contact with each other but preferably leaves at least part of the the mid section of the annular plate member free form resilient material. At this mid section, the built-in sealing member will have the thickness of only the annular plate member itself, which increases the space available for the rolling bodies and/or of a cage restricting the movement of the rolling bodies. Misalignment can therefore be accepted to a larger degree before a roller or the cage will interfere with the sealing member. Hence, a more compact bearing can be designed, which may house a wider roller body in relation to the total axial extension of the roller bearing.

Hence, by providing a built in sealing member where separate resilient members are arranged at respective periphery portions of the annular plate ring, a self aligning roller bearing is provided, which gives additional space for ring cages extending outside of the rolling bodies or which gives more space for the rolling bodies before the ring cage or rolling body interferes with the built-in sealing member.

Furthermore, by providing a sealing member including an annular plate ring and first and second separate resilient members, it will be possible to form and adhere the resilient members in smaller tools, which is of importance for large bearings due to the complexity of making large tools. Hence, the proposed design of the sealing for the large sealed self aligning bearing facilitates production due to that tools for adhering the resilient members are smaller and hence less difficult to manufacture. Large press tools are more difficult to manufacture which increases the cost.

Furthermore, the resilient members may be produced by turning a ring shaped element. The ring may then be cut and subsequently adhered to the annular plate ring. The resilient members could also be extruded to either a band-shaped element or a ring shape. The band-shaped elements may then be cut in appropriate lengths to be adhered onto the annular plate ring. The resilient members may be adhered in many different ways, such as gluing or spot vulcanization around the annular plate, i.e. there is no need of large vulcanization tools.

Furthermore, by providing a sealing member including an annular plate ring and first and second separate resilient members, it will be possible to form and adhere the resilient members onto the annular plate ring manually. Since large sealed self-aligning bearings often are manufactured in small series, it may be more economical to manually assemble the sealing member without the need to use large vulcanization tools.

Preferably the annular land is free from resilient material. The annular land may however by coated by a thin protective coating, if desired.

Optionally, the second separate resilient member includes a lip portion extending outwardly from said annular plate ring to be in abutment with said sealing surface and an attachment portion for attachment of said second separate resilient member to said second periphery portion, wherein a length extension of said lip portion and said attachment portion are essentially the same. By forming the lip portion with essentially the same extension in length as the attachment portion, at which the second separate resilient member is in contact with and secured to the annular plate ring, it is ensured that a high degree of resiliency is allowed for provision of good sealing properties, while at the same time a lasting joint between the second resilient member and the annular plate member is obtained.

Optionally, the first resilient member is attached to a back side and top of the annular plate ring, leaving a front side of the annular plate ring free from the resilient member at said first periphery portion, in that a locking ring is inserted into said mounting groove on an exterior side of said annular plate ring, wherein direct contact is allowed between the annular plate ring and the locking ring. By allowing direct contact between the annular plate ring and the locking ring, the annular plate ring can be secured to the first race ring in a very rigid member ensuring secure and rigid connection between the annular plate ring and the first race ring.

In an embodiment, the first resilient member is attached to a back, top and exterior side of the annular plate. In such a configuration, a locking ring may be inserted into the mounting groove on the exterior side of said annular plate ring and be in contact with the first resilient member to thereby tightly secure the sealing member to the bearing.

The first resilient member may include protrusions on a side facing away from the annular plate ring, which protrusions engages with a side wall of said groove to allow a resilient mounting of said sealing member. In this case, the protrusions will serve for the flexibility and resiliency in the mounting. In this manner a desired flexibility can be obtained at high tolerances, while securing precise mounting of the annular plate ring.

Optionally, the first and second resilient members are each formed from a band-shaped element folded to form a ring and attached to said annular plate member. The first and resilient members includes a joint, which joints may be circumpherentially displaced in relation to each other. By circumpherentially displacing the joints, any imbalance due to the joints will be reduced.

In a preferred method of production, the sealing member for the large self aligning bearing includes the steps of:
providing a ring shaped sheet metal;
roll forming the sheet metal to an annular plate ring including a first peripheral portion, a mid section and a second peripheral portion, wherein said first periphery portion and mid section are joined at a first knee at which first knee the first periphery portion and mid section forms a tapering angle with respect to each other, and wherein the second periphery portion and mid section are joined at a second knee at which second knee the second periphery portion and mid section forms an angle with respect to each other;

attaching a first resilient member to the first peripheral portion and a second resilient member to the second peripheral portion.

The step of attaching the resilient members to the annular plate ring may preferably be made by an adhesive.

Typically, at least the second periphery portion will be inclined toward a centre of the roller bearing. When the built-in sealing member is mounted in the mounting groove, the mid portion will be the part of the built in sealing member, which is located at the largest distance in an axial direction from the centre of the roller bearing. This means that by providing a mid section that is free from resilient material, the plate ring of built-in member can be located the further away from the centre of the rolling bearing.

Optionally, the first periphery portion and mid section meet at a first knee at which first knee portion the first periphery portion and mid section forms a tapering angle with respect to each other, and wherein the second periphery portion and mid section meet at a second knee at which second knee the second periphery portion and mid section forms an angle with respect to each other.

The angle at the second knee may be tapering with a relatively small angle or forming an almost right angled knee depending on whether a protruding cage is used or not.

The annular land may preferably at least extend from the first knee to the second knee, while the first resilient member is attached to the first periphery portion and being located outside of said first knee in a direction towards a first end of the plate ring and the second resilient member is attached to the second periphery portion and being located outside of said second knee in a direction towards a second end of the plate ring. In this embodiment the plate ring is bent toward a centre of the bearing at both the first knee and at the second knee, leaving the mid section which constitutes a land in between said first and second knees, which land will be located furthest from the axial centre of the bearing. Preferably at least this land is completely free from resilient material.

For large self aligning roller bearings, the said annular plate ring is preferably roll formed. It has shown to be difficult to form the annular plate ring with other technologies while maintaining high tolerances and preventing crack initiation for large self aligning roller bearings.

Preferably, the mounting groove being situated axially inside a side plane of the first race ring and being arranged to taper at an angle relative to said side plane. This allows for a particularly compact design of the roller bearing.

Preferably, the groove has an opening on the inner periphery of the first race ring which opening is situated outside a race track of the first race ring and a closed inner end which lies at a radial distance and axially inside said opening, and in that said inner end is situated axially inside an outer axial limit of said race track in the first race ring. Also this contributes to a compact design of the bearing.

Optionally, the mid section is free from resilient material and the mid section is parallel with a side plane of said first race ring and/or a side plane of said second race ring.

Preferably, the mid section is flush with or lies at a small axial distance inside said side plane of said first race ring and/or a side plane of said second race ring. The small axial distance is preferably less than twice the thickness of the annular plate ring.

BRIEF DESCRIPTION OF DRAWINGS

Embodiments of the invention will be described in more detail with reference to appended drawings, where FIG. 1 shows a first embodiment of an annular plate ring having first and second separate plate members, FIG. 2 shows a second embodiment of an annular plate ring having first and second separate plate members.

DETAILED DESCRIPTION OF EMBODIMENTS OF THE INVENTION

Figure 3:
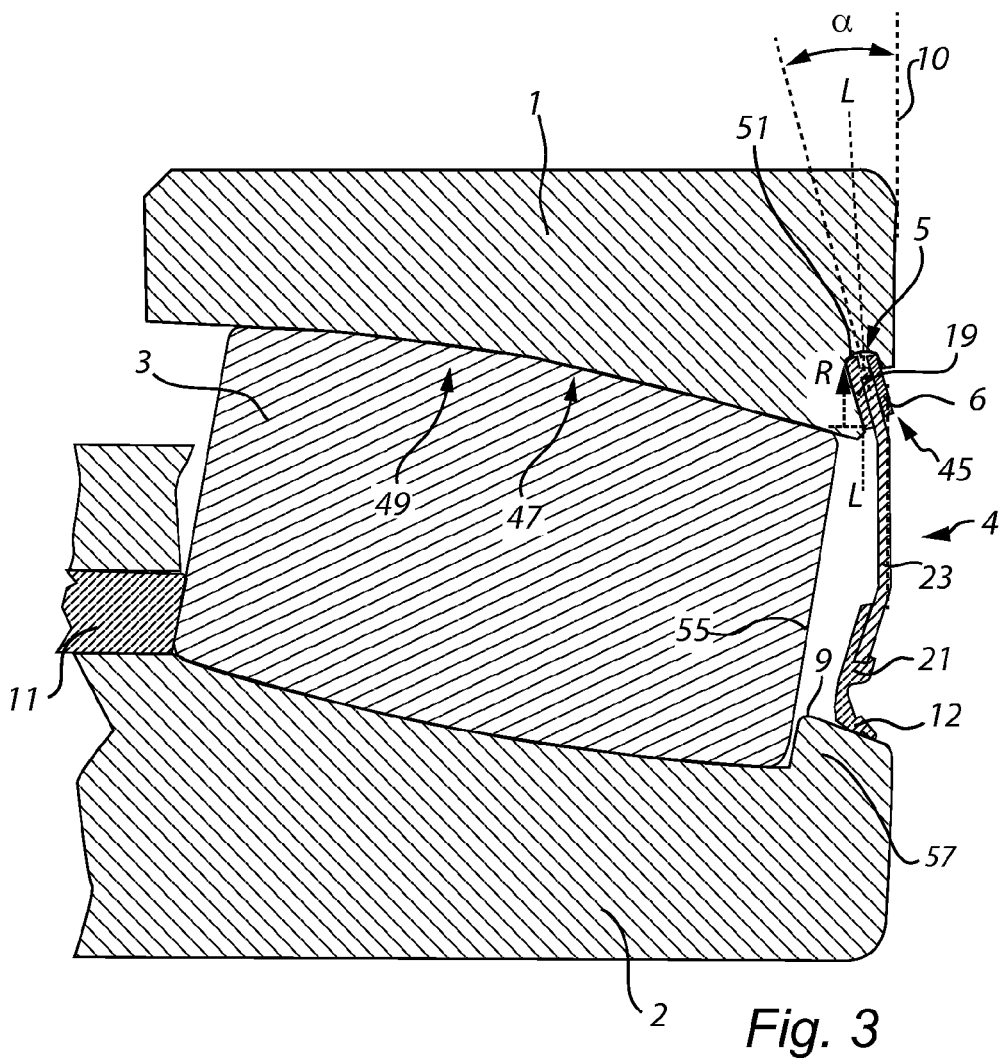
FIG. 3 shows a section through the sealing member affixed to a spherical roller bearing including a built-in sealing member according to one embodiment of the invention, FIG. 3A show the first resilient member mounted in a mounting groove in more detail.

In FIG. 1 a sealing member is shown. The sealing member shown in FIG. 1 is suitable for a self aligned roller bearing having a cage that does not extend on the outside of the roller. The sealing member 4 includes an annular plate ring 7. The annular plate ring includes a first periphery portion 15 and a second periphery portion 17. A first resilient member 19 is attached to the first periphery portion 15 and a second separate resilient member 21 is attached to the second periphery portion. The first and second separate resilient members 19, 21 are spaced apart to leave an annular land 22a, 22b in a mid section 23 of said annular plate ring 7 in between said first and second resilient members. Preferably the annular land is free from resilient material on both sides of said ring. With both sides is here intended a first inner side 25a facing the interior of the bearing and a second outer side 25b facing the exterior of the bearing.

The annular land may preferably have a circular inner and outer periphery. However, the annular land may have a differently shaped periphery such a hexagonally shaped periphery, a periphery with indentations or protrusions. However, any protrusion or indentations are small with respect to an average diameter of the annular land. Hence, the built-in sealing member is provided with separate resilient members at both the inner and outer peripheries, which resilient members are not in direct contact with each other but leaves at least part of the mid section 23 of the annular plate ring 7 free form resilient material.

The first resilient member 19 is attached to a back side 31a and top 31b of the annular plate ring, leaving a front side 31c of the annular plate ring free from the resilient member at the first periphery portion 15. The back side is the side which will face the interior of the bearing in mounted state of the sealing member. The top 31b is the edge of the annular plate ring 7.

A locking ring may thereby be inserted into a mounting groove on an exterior side of said annular plate ring, in a manner allowing direct contact between the annular plate ring and the locking ring.

The first resilient member 19 may include protrusions 33 on a side 35 facing from the annular plate ring 7, which protrusions 33 are arranged to engage with a side wall of a mounting groove groove to allow a resilient mounting of said sealing member. This is shown in more detail in FIG. 3A.

The second separate resilient member 21 includes a lip portion 27a extending outwardly from the annular plate ring 7, that is the lip portion 27a extends away from a rim or edge 29 of the annular plate ring. The second resilient member further includes an attachment portion 27b for attachment of the second separate resilient member 21 to the second periphery portion 17. A length extension of said lip portion 27a and a length extension of the attachment portion 27b are essentially the same.

The second periphery portion 17 may be inclined toward a centre of the roller bearing. When the built-in sealing member is mounted in the mounting groove, the mid portion 23 will be the part of the built in sealing member, which is located at the largest distance in an axial direction from the centre of the roller bearing.

In the embodiment shown in FIG. 1, the first end section 15 and mid section 23 meet at a first knee 37 at which first knee 37 the first periphery portion 15 and mid section forms 23 a tapering angle with respect to each other, and wherein the second periphery portion 17 and mid section 23 meet at a second knee 39, at which second knee 39 the second periphery portion 17 and mid section 23 forms a tapering angle with respect to each other.

The annular land 22a, 22b may preferably at least extend from the first knee 37 to the second knee 39. The first resilient member 19 is attached to the first periphery portion 15 and being located outside of said first knee 37 in a direction towards the first end or edge 31b of the plate ring 7 and the second resilient member 21 is attached to the second periphery portion 17 and being located outside of said second knee 39 in a direction towards the second end or edge 29 of the plate ring. In this embodiment the plate ring 7 is bent toward an axial centre of a bearing as indicated by arrow C at both the first knee 37 and at the second knee 39. Further, the mid section 23 extending between said first and second knees 37, 39, will in mounted state be located furthest from the axial centre C of the bearing. The mid section is here is completely free from resilient material. Also part of the plate ring located outside of the first and second knees may be free from resilient material, to form a continuous region free from resilient material that extend over said knees such that at least a flat portion of the annular ring forming a wall part of the sealing is free from resilient material.

FIG. 2 shows a second embodiment of a sealing member is shown. The sealing member shown in FIG. 1 is suitable for a self aligned roller bearing having a cage that does extend on the outside of the roller. The first periphery portion and the mid section may be shaped as in the embodiment shown in FIG. 1. In the embodiment shown in FIG. 2, the first periphery and second periphery portions differ from the periphery portions of FIG. 1. The first resilient member 19 is attached to both a front and back side of the plate ring 7 in the first periphery portion 15.

Further, the second knee 39 makes a sharp bend such that the second periphery portion 21 stretches inwardly toward an axial centre of a bearing as indicated by arrow C. This construction allows more space for a roller cage extending on the outside of the rollers.

Also in this embodiment, the mid section 23 is completely free from resilient material.

Figure 3A:
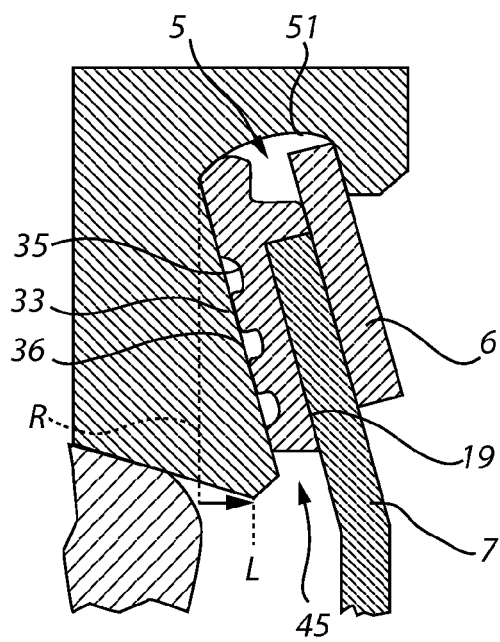

FIG. 3 shows sealing member as shown in FIG. 1 mounted in a bearing.

The spherical roller bearing 10 incorporates a first race ring 1, and second race ring 2, rolling bodies 3 arranged between the race rings in two rows, and a roller body cage 11. The first race ring is an outer race ring and the second race ring is an inner race ring. Both sides of the bearing 10 are provided with sealing members 4, which, as can be seen from the figures, are situated inside the side plane of the bearing 10. The roller bearing cage 11 supports the interior side of 53 of the roller.

The exterior side 55 of the roller 3 is guided by a guide flange 57. A sealing surface 9 is arranged on the guide flange 57. The sealing surface is tapered in the outward direction and is arranged to be in abutment with a second resilient member 21 arranged on the sealing member 4. The sealing members 4 are of the type as shown in FIG. 1. The sealing members 4 are affixed in the locking ring grooves 5 in the first outer race ring 1. The locking ring groove 5 is tapered at an angle alpha relative to the side plane of the bearing in the position when this side plane is parallel to a diametrical centre plane through the bearing. The centers of the different cones are situated on the axial centre line of the bearing at some distance from the intersection of this centre line with the different side planes. Angle alpha is preferably fifteen to twenty degrees.

Preferably, the groove may have an opening 45 on an inner periphery 47 of the first race ring 1 which opening is situated outside a race track 49 of the first race ring 1 and a closed inner end 51 which lies at a radial distance R and axially shifted in an axial direction toward a centre of the bearing to preferably be located inside said opening. Hence, the inner end 51 may be situated axially inside an outer axial limit L of said race track 49 in the first race ring. This is shown in more detail in FIG. 3A.

The sealing member 4 comprises an annular plate ring 7, the outer part of which is tapering radially inwards at a taper angle substantially corresponding to the taper angle alpha of the locking ring groove 5, and the inner portion of which is bent inwardly to take up an almost axial extension. At the outer periphery of the plate ring 7 the first resilient member 19 may be defined as an extension of the plate 7, whereas the second resilient member 21 at the inner periphery of the plate ring 7 constitutes an elongation 12, extending tapering angularly outwards and engaging a tapering surface 9 on the inner race ring. This surface 9 could also be spherical.

Figure 6:
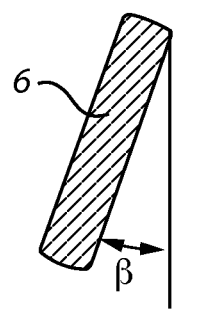
FIG. 6 is a detail view showing a portion of the locking ring of the embodiment as shown in FIGS. 4 and 5 and illustrating its taper angle relative to the side surface of the race ring.

The outer portion of the first resilient member 19 is mounted in the locking ring groove 5 in the outer race ring 2, and it is affixed with a locking ring 6. Preferably the locking ring 6 has a tapering shape and has a taper angle beta, preferably only a little smaller than the taper angle alpha of the locking ring groove. In the embodiment shown alpha is about 15 DEG, whereas beta is about 11 DEG. The locking ring 6 is shown in FIG. 6.

As the taper angle beta of the locking ring 6 is smaller than alpha a preload is obtained between locking ring 6 and the sealing member 4, which means that the sealing member is clamped, whereby a reliable and stable attachment is obtained. The sealing member 4 is detachable, whereby maintenance, inspection, etcetera, is facilitated.

It would be possible to use also locking rings where beta=0 DEG, i.e. where the locking ring is not tapering. Such an embodiment would give a particularly strong clamping effect between the sealing member and the locking ring in the groove.

Figure 4:
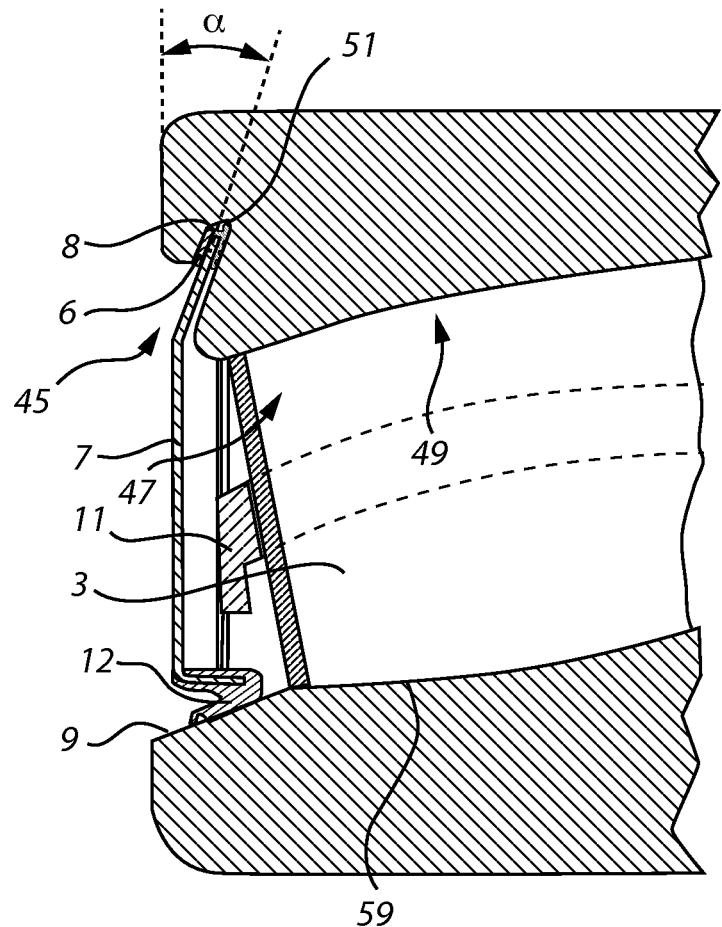
FIG. 4 shows a section through the sealing member affixed to a spherical roller bearing including a built-in sealing member according to another embodiment of the invention.

FIG. 4 shows sealed self aligning bearing including a sealing member as shown in FIG. 2 mounted in a bearing. A difference between the bearing shown in FIG. 3 and the bearing shown in FIG. 4 is that in the embodiment shown in FIG. 4 the roller bearing cage 11 supports the interior and exterior sides of 53, 55 of the roller. A sealing surface 9 is arranged as a continuation of the race track 59 of the second race ring 2. The sealing surface is tapered in the outward direction and is arranged to be in abutment with a second resilient member 21 arranged on the sealing member 4.

Figure 5:
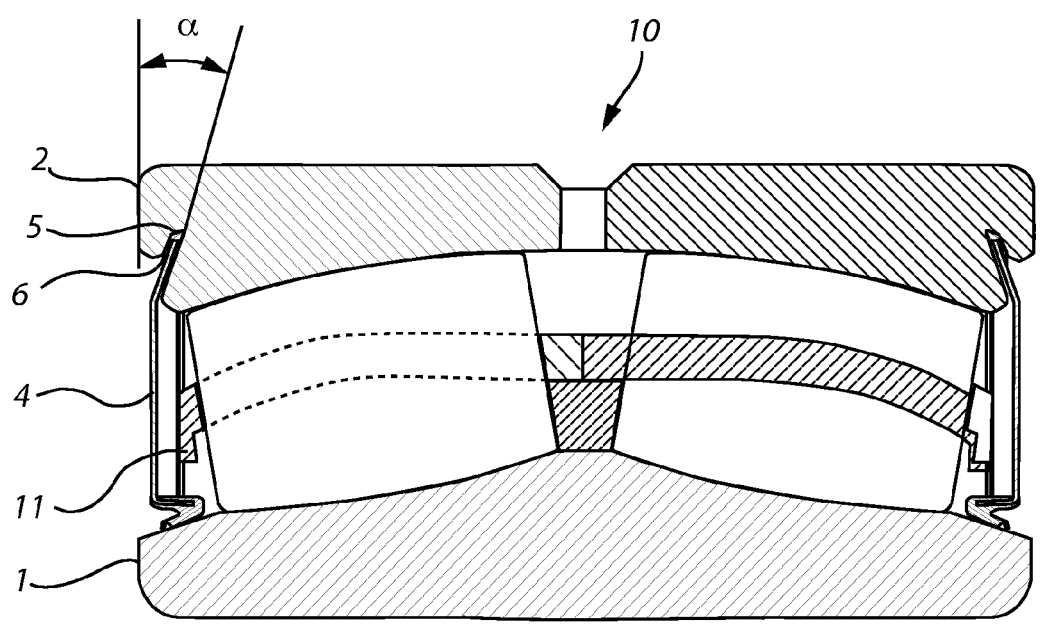
FIG. 5 shows a bearing including a built-in sealing member as shown in FIG. 4, in cross-section and having sealing members mounted thereto.

FIG. 5 shows a double row sealed self aligning bearing having the design as shown in FIG. 4. A sealing member 4 is arranged on each end of the bearing.

It is obvious that shape, choice of material, etcetera for the sealing member 4 and also for the locking ring 6 may vary like the type of bearing.

The invention claimed is:

1. A roller bearing that is sealed, comprising,
    a first race ring,
    a second race ring,
    rolling bodies arranged between the first race ring and the second race ring, and
    a sealing member comprising an annular plate ring which when viewed in cross-section is formed by only three linear sections: a first linear section that forms a first periphery portion; a second linear section which forms a mid section having an annular land; and a third linear section which forms a second periphery portion, the first periphery portion being inclined relative to the annular land to form a first knee therebetween, the second periphery portion being inclined relative to the annular land to form a second knee therebetween, and wherein the first race ring includes a mounting groove for receiving the first periphery portion and the second race ring includes a sealing surface,
    wherein a first resilient member is attached to the first periphery portion for sealing the mounting groove and a second resilient member is attached to the second periphery portion for sealing abutment with the sealing surface on the second race ring, the first and second resilient members are separate and spaced apart, the second linear section being free of resilient material, the first resilient member being spaced from and outside of the first knee relative to the annular land, the second resilient member being spaced from and outside of the second knee relative to the annular land.

2. The roller bearing of claim 1, wherein the second resilient member includes a lip portion extending outwardly from the annular plate ring to be in abutment with the sealing surface and an attachment portion for attachment of the second separate resilient member to the second periphery portion, wherein a length of the lip portion and a length of the attachment portion are the same.

3. The roller bearing of claim 1, wherein the first resilient member is attached to a back side and a top of the first periphery portion, leaving a front side of the annular plate member free from any resilient material at the first periphery portion, and in that a locking ring is inserted into the mounting groove on an exterior side of the annular plate ring, wherein direct contact is allowed between the annular plate member and the locking ring.

4. The roller bearing of claim 3, wherein the first resilient member includes axially extending protrusions on a side facing from the annular plate ring, which protrusions engages with a side wall of the groove to allow a resilient mounting of the sealing member.

5. The roller bearing of claim 1, wherein the mounting groove is situated inside a side plane of the first race ring and arranged to taper at an angle relative to the side plane.

6. The roller bearing of claim 5, wherein the groove has an opening on the inner periphery of the first race ring which opening is situated outside a race track of the first race ring and a closed inner end which lies at a radial distance and axially inside the opening, and in that the inner end is situated axially inside an outer axial limit of the race track in the first race ring.

7. The roller bearing of claim 1, wherein the mid section is parallel with a side plane of at least one of the first race ring and a side plane of the second race ring.

8. The roller bearing of claim 7, wherein the mid section is flush with or lies at an axial distance less than twice the thickness of the annular plate ring inside the side plane of the first race ring and/or a side plane of the second race ring.

9. The roller bearing of claim 1, wherein the roller bearing is a spherical roller bearing.

10. The roller bearing of claim 1, wherein the roller bearing is a toriodal roller bearing.

* * * * *